US008621544B2

United States Patent
Li et al.

(10) Patent No.: US 8,621,544 B2
(45) Date of Patent: Dec. 31, 2013

(54) MITIGATATION OF VIDEO ARTIFACTS

(75) Inventors: Zhi Li, Martinez, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1212 days.

(21) Appl. No.: 12/190,880

(22) Filed: Aug. 13, 2008

(65) Prior Publication Data

US 2010/0043044 A1    Feb. 18, 2010

(51) Int. Cl.
*H04N 7/173* (2011.01)
*G06F 3/00* (2006.01)

(52) U.S. Cl.
USPC ........... 725/118; 725/109; 725/114; 725/116; 725/117; 715/723

(58) Field of Classification Search
USPC ........................................................ 725/118
See application file for complete search history.

(56) References Cited

U.S. PATENT DOCUMENTS

| 5,852,475 | A | 12/1998 | Gupta et al. | |
|---|---|---|---|---|
| 6,230,162 | B1 * | 5/2001 | Kumar et al. | 382/240 |
| 6,476,873 | B1 | 11/2002 | Maeng | |
| 6,782,550 | B1 * | 8/2004 | Cao | 725/39 |
| 2006/0230176 | A1 * | 10/2006 | Dacosta | 709/235 |
| 2007/0256096 | A1 * | 11/2007 | Wilhelm | 725/34 |
| 2009/0147746 | A1 * | 6/2009 | Alay et al. | 370/329 |
| 2010/0098176 | A1 * | 4/2010 | Liu | 375/259 |

* cited by examiner

*Primary Examiner* — Mushfikh Alam
(74) *Attorney, Agent, or Firm* — Toler Law Group, PC

(57) ABSTRACT

Methods, systems and computer-readable storage media are disclosed to mitigate video artifacts in video content transmission. A method to mitigate video artifacts in a video content transmission includes analyzing one or more video quality metrics received from each of a first plurality of video content receivers to determine a representative set of one or more video quality metrics. At least one of the video quality metrics of the representative set is associated with artifacts of a first portion of the video content transmission. The method further includes setting one or more encoder parameters based on the at least one of the video quality metrics of the representative set, encoding a second portion of the video content transmission using the one or more encoder parameters, and transmitting the encoded second portion to a second plurality of video content receivers.

18 Claims, 7 Drawing Sheets

MITIGATATION OF VIDEO ARTIFACTS

TECHNICAL FIELD

The present application relates generally to mitigation of video artifacts.

BACKGROUND

A video distribution system's network conditions can impact transmission of video content to end users' receivers. Additionally, the network conditions can reduce quality of the video content displayed on the end users' video display devices. For example, the video content displayed can include display artifacts, such as video and sound synchronization problems that affect the end users' satisfaction with the video distribution system and their retention as customers of the video distribution system.

BRIEF DESCRIPTION OF THE DRAWINGS

Some embodiments are illustrated by way of example and not limitation in the figures of the accompanying drawings in which.

DETAILED DESCRIPTION

Figure 1:
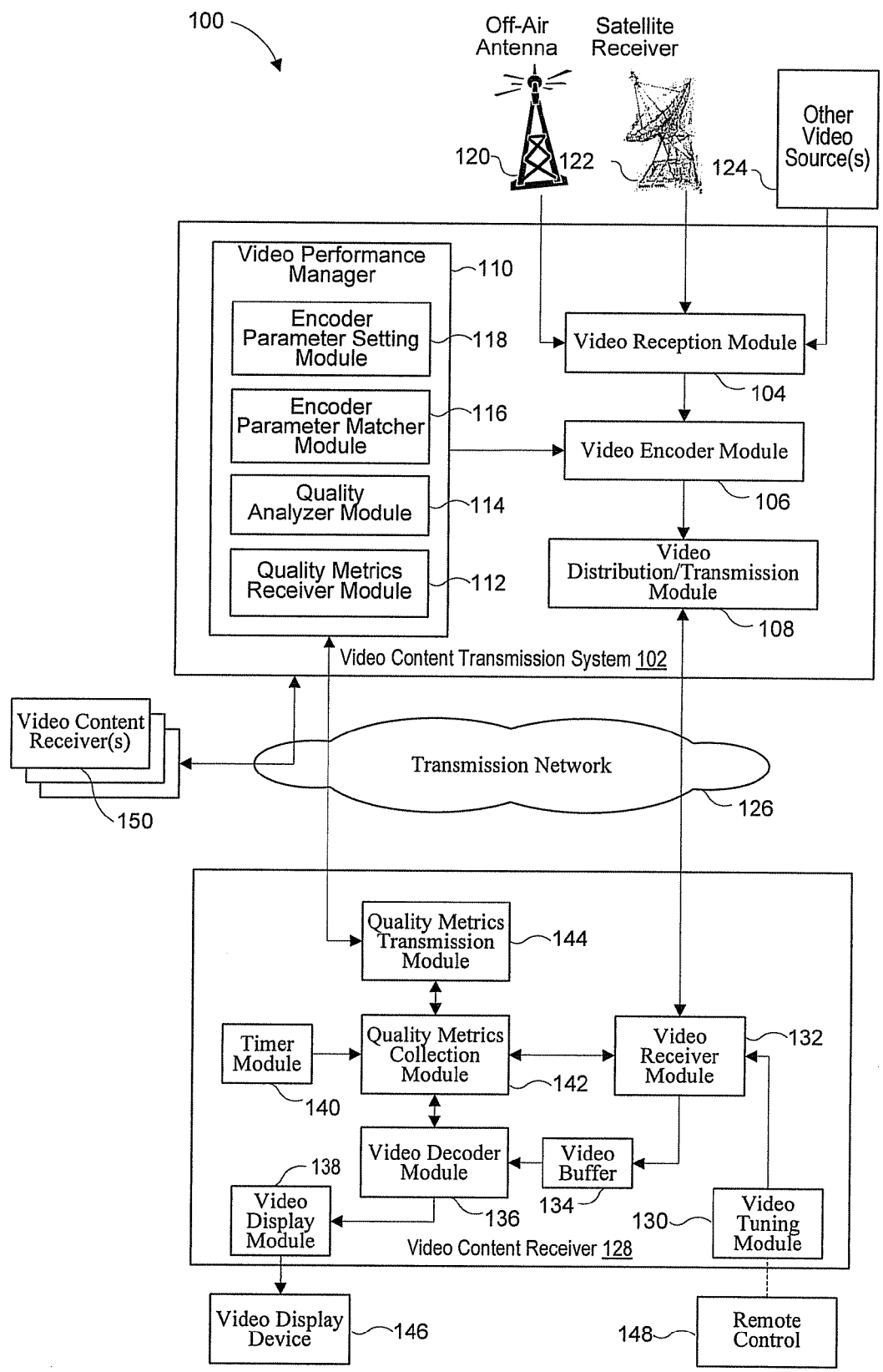
FIG. 1 is a block diagram of an embodiment of a video distribution system.

Methods, systems and computer-readable storage media to mitigate video artifacts in video content transmission are disclosed. In the following description, for the purposes of explanation, numerous specific details are set forth in order to provide a thorough understanding of particular embodiments. It will be evident to one skilled in the art, however, that certain embodiments may be practiced without these specific details.

In a particular embodiment, a method to mitigate video artifacts in a video content transmission includes analyzing one or more video quality metrics received from each of a first plurality of video content receivers to determine a representative set of one or more video quality metrics. At least one of the video quality metrics of the representative set is associated with artifacts of a first portion of the video content transmission. The method further includes setting one or more encoder parameters based on the at least one of the video quality metrics of the representative set, encoding a second portion of the video content transmission using the one or more encoder parameters, and transmitting the encoded second portion to a second plurality of video content receivers.

In another particular embodiment, a video content receiver is disclosed. The video content receiver includes a collection module to collect one or more video quality metrics associated with artifacts of a portion of a video content transmission and a transmission module to transmit the one or more collected quality metrics to a video content transmission system. The video content receiver also includes a receiver module to receive for display a subsequent portion of the video content transmission. The subsequent portion is encoded in accordance with one or more encoder parameters that are determined by the video content transmission system based on one or more video quality metrics collected from each of a plurality of video content receivers that have received the portion of the video content transmission.

In yet another particular embodiment, a video content transmission system to mitigate video artifacts in a video content transmission is disclosed. The video content transmission system includes a video performance manager to adjust one or more encoder parameters based on a representative set of one or more video quality metrics each of which has a value that does not satisfy a threshold. The one or more video quality metrics of the representative set are associated with artifacts of a portion of the video transmission received by a plurality of video content receivers. The video content transmission system further includes an encoder module to encode a subsequent portion of the video content transmission using the one or more encoder parameters In a further particular embodiment, a computer-readable storage medium is disclosed. The computer-readable storage medium includes operational instructions that, when executed by a processor, cause the processor analyze one or more video quality metrics received from each of a first plurality of video content receivers to determine a representative set of one or more video quality metrics. At least one of the video quality metrics of the representative set is associated with artifacts of a first portion of the video content transmission. The computer-readable storage medium also includes operational instructions that, when executed by a processor, cause the processor to set one or more encoder parameters based on the at least one of the video quality metrics of the representative set, encode a second portion of the video transmission using the one or more encoder parameters, and transmit the encoded second portion to a second plurality of video content receivers.

FIG. 1 is a block diagram of a particular embodiment of a video distribution system 100 that mitigates video artifacts in a video content transmission. The video distribution system 100 includes a video content transmission system 102, one or more video content sources 120, 122 and 124, a transmission network 126, and plural video content receivers 128 or 150. Although only video content receiver 128 is described in detail below for clarity and brevity purposes, the other video content receivers 150 may be similar to or different than the video content receiver 128. Furthermore, although one video content transmission system 102 is shown and described for clarity and brevity purposes, the video distribution system 100 may include multiple video content transmission systems, with each video content transmission system servicing multiple video content receivers. The transmission network 126 enables communication between the video content transmission system 102 and the video content receivers 128, 150.

The transmission network 126 may include one or more of a long haul transport network (e.g., a gigabit Ethernet network, an Asynchronous Transfer Mode (ATM) network, a frame relay network), a wireless network (e.g., a satellite network, a Wi-Fi network, or another wireless network), other public or private networks, or any combination thereof. The transmission network 126 may also include connections, such as fiber to the home (FTTH), fiber to the node (FTTN), telephone (e.g., digital subscriber line (DSL)), coaxial cable, hybrid fiber/coaxial, wireless or any other combination thereof. The foregoing is not exhaustive and alternate or additional transmission networks 126 as well as connections may be employed to interconnect the video content transmission system 102 to the video content receiver 128.

The video content transmission system 102 is configured to service multiple video content receivers 128, 150 that are members of a multicast group of a video content transmission. The video content transmission system 102 includes a video reception module 104, a video encoder module 106, a video distribution/transmission module 108, and a video performance manager 110.

The video reception module 104 receives video content from multiple video sources, such as an off-air antenna 120, a satellite receiver 122, or one or more other video sources 124 (e.g., fiber feed sources, video servers and tape machines). The video content received by the video reception module 104 may be in a variety of formats, such as the National Television System Committee (NTSC) format, the Advanced Television Systems Committee (ATSC), the Moving Pictures Experts Group (MPEG)-2 and MPEG-4 formats, the Digital Video Broadcasting (DVB) format, the Windows Media format, baseband digital format, and other available formats.

The video encoder module 106 cooperates with the video reception module 104 to provide the video content received by the video reception module 104 to the video distribution/transmission module 108 in a standardized format. More specifically, the video reception module 104 may decode and may further convert the video content received in the aforementioned different formats into a standardized format. In turn, the video encoder module 106 may further encode the video content provided in the standardized format into a digital format for distribution of the video content. For example, the digital format may be MPEG-2, MPEG-4, or another digital media format. The video content may be encoded in accordance with one or more encoder parameters set or adjusted by the video performance manager 110.

The transmission network 126 includes one or more devices configured to receive a request from each of one or more of the video content receivers 128, 150 to join a multicast group and to distribute the video content transmission to each of the one or more of the video content receivers 128, 150 joined to the multicast group. For clarity and brevity the following description relates to one multicast group of a video content transmission. However, the video distribution/transmission module 108 may maintain plural multicast groups and may further service multiple video content receivers that are members of each multicast group in accordance with the following description. For example, each multicast group may be associated with a particular television channel of an Internet Protocol Television (IPTV) system.

The video performance manager 110 is communicatively coupled to the video encoder module 106 and is configured to set or adjust one or more encoder parameters of the video encoder module 106 to mitigate video artifacts in the video content transmission to be delivered or transmitted to the multicast group of the video content transmission. More specifically, the video performance manager 110 is configured to set or adjust encoder parameters of the video encoder module 106 based on a representative set of one or more video quality metrics. Each video quality metric of the representative set may have a value that does not satisfy a threshold. The one or more video quality metrics of the representative set are associated with artifacts of a portion of the video content transmission received by plural video content receivers of the multicast group (e.g., two or more of the video content receivers 128, 150). For example, a video quality metric may relate to microblocking or black screen in the video content, to video-sound synchronization (e.g., lip-synch) of the video content, to jitter, packet loss and latency of the video content, or other video quality metrics. The video performance manager 110 includes a quality metrics receiver module 112, a quality analyzer module 114, an encoder parameter matcher module 116, and an encoder parameter setting module 118.

After a portion of the video content is transmitted to the video content receivers 128, 150, the quality metrics receiver module 112 may receive one or more video quality metrics from each of the video content receivers 128, 150 that is a member of the multicast group of the video content transmission. The video quality metrics may be based on the quality of the portion of the video content received at the video content receivers 128, 150. The quality metrics receiver module 112 may poll the video content receivers 128, 150 at predetermined time intervals, or when a problem is detected, to receive the one or more video quality metrics from each of the video content receivers 128, 150. Alternatively or in addition, each of the video content receivers 128, 150 may also be configured to periodically send the one or more video quality metrics to the quality metrics receiver module 112.

The quality analyzer module 114 is configured to analyze the video quality metrics received by the quality metrics receiver module 112. The quality metrics receiver module 112 may determine a representative set of the video quality metrics. Each of the video quality metrics of the representative set may have a value that does not satisfy a threshold. For example, microblocking may be determined when a number of video decoder errors in a given time period is over an acceptable number of errors. As another example, jitter (or average jitter) may be determined when a latency period between reception of packets by a video content receiver is over an acceptable latency period. The one or more video quality metrics of the representative set are associated with artifacts of a portion of the video content transmission received by video content receivers 128, 150 that are members of the multicast group.

The encoder parameter matcher module 116 matches the one or more video quality metrics of the representative set to one or more encoder parameters that may be set in order to mitigate video artifacts in the video content transmission. The encoder parameter setting module 118 sets values of the matched one or more encoder parameters based on values of the one or more quality metrics of the representative set. The set one or more encoder parameters are used by the video encoder module 106 to encode another portion of the video content transmission to be received by video content receivers 128, 150 that are members of the multicast group.

The video content receivers 128, 150 are configured to receive video content from the video content transmission system 102 via the multicast group. For brevity and clarity, the following description describes the components of the video content receiver 128. The other video content receivers 150 may be similar to or different than the video content receiver 128. For example, the video content receiver 128 may be a set top box and the video content receivers 150 may be mobile receivers. The video content receiver 128 includes a video tuning module 130, a video receiving module 132, a video buffer 134, a video decoder module 136, a video display module 138, a timer module 140, a quality metrics collection module 142 and a quality metrics transmission module 144. The video content receiver 128 is further configured to receive input from a remote control device 148 and to display the video content via a video display device 146.

The tuning module 130 receives a channel selection from a user via the remote control 148 and instructs the video receiver module 132 to send a multicast group join request to a component of the transmission network 126, such as a network edge server (not shown) or another device that maintains a list of receivers joined to particular multicast groups. In response to the multicast group join request from the video content receiver 128, the video content receiver 128 may be added to the multicast group associated with the selected channel.

The video receiver module 132 receives the video content transmission of the multicast group from the video content transmission system 102. The video receiver module 132 is further configured to determine one or more video quality metrics associated with the video content transmission, such as packet loss, latency, jitter, and compression ratio. The video receiver module 132 may also determine other reception-related quality metrics.

The video buffer 134 buffers multiple portions of the video content transmission. For example, the video buffer 134 may buffer a determined number of data packets of the video content transmission to allow for de-jitterring the video content transmission. The video buffer 134 may transmit the buffered portions of the video content transmission for decoding and display. A size of the video buffer 134 may be dynamically adjustable based on one or more encoder parameters of the video content transmission of the multicast group. For example, an encoder parameter may indicate a bigger video buffer to allow greater time for recovery of lost packets in poor network conditions.

The video decoder module 136 decodes the buffered portion of the video content transmission from the video buffer 134 in accordance with one or more encoder parameters for display on the video display device 146 via the video display module 138. In a particular embodiment, the quality metrics collection module 142 collects one or more video quality metrics from the video decoder module 136 and/or the video receiver module 132, periodically, based on collection timing indications that may be provided by a timer module 140. For example, the video quality metrics from the video receiver module 132 may include video quality metrics associated with receiving the video content transmission from the video content transmission system 102. These video quality metrics may include packet loss, latency, jitter, and compression ratio, as well as other reception-related video quality metrics. The video quality metrics collected from the video decoder module 136 may include video quality metrics associated with decoding the video content transmission. These video quality metrics may include microblocking, black screen, lip-synch, as well as other decoding-related quality metrics. In another particular embodiment, the quality metrics collection module 142 may collect video quality metrics in a non-periodic manner, such as occasionally or when a problem is indicated.

The quality metrics transmission module 144 receives the one or more video quality metrics from the quality metrics collection module 142 and transmits the video quality metrics to the video performance manager 110 of the video content transmission system 102.

The operation of the video distribution system 100 will now be described. In response to a user selecting a channel via the remote control 148, the video tuning module 130 instructs the video receiver module 132 to send a multicast group join request associated with the requested channel to the transmission network 126. The video distribution/transmission module 108 sends a portion of video content transmission to the multicast group via the transmission network 126. The video content receiver 128 receives the portion via the video receiver module 132. The video buffer 134 buffers data packets of the portion of the video content transmission until the video buffer 134 is filled. The size of the video buffer 134 is based on the one or more encoder parameters of the portion and is sufficient to de-jitter the portion of the video content transmission. The video buffer 134 sends the data packets to the video decoder module 136. The video decoder module 136 decodes data packets in accordance with one or more encoder parameters. The video decoder module 136 sends decoded video data to the video display module 138, which sends the video data to the video display device 146 for display.

Before the video content receiver 128 sends its first collected video quality metrics, the portion of the video content transmission received by the video content receiver 128 is encoded based on the one or more encoder parameters set on the basis of video quality metrics previously received by the video content transmission system 102 from other video content receivers joined to the multicast group at that time. For example, the video content receivers 150 may be joined to the multicast group before the video content receiver 128 joins the multicast group. The video content receivers 150 may also have transmitted video quality metrics to the video content transmission system 102 before the video content receiver 128 joined. These previously received video quality metrics were associated with artifacts of a portion of the video content transmission received by the video content receivers 150 from the video content transmission system 102 before the video content receiver 128 joined the multicast group. The portion of the video content sent to the video content receiver 128 may have been encoded based on these previously received video quality metrics.

In a particular embodiment, the timer module 140 generates a periodic timing indication to the quality metrics collection module 142 to collect one or more video quality metrics associated with a portion of the video content transmission. The quality metrics collection module 142 collects one or more video quality metrics from the video receiver module 132, from the video decoder module 136, or both. In an alternate embodiment, the quality metrics collection module 142 may collect the video quality metrics occasionally or when a problem is indicated by the video receiver module 132, by the video decoder module 136, or both. The quality metrics collection module 142 provides the video quality metrics to the quality metrics transmission module 144. The quality metrics transmission module 144 transmits the collected video quality metrics to the video performance manager 110. Other of the video content receivers 150 that are members of the multicast of the video content transmission also transmit video quality metrics to the video performance manager 110.

The quality metrics receiver module 112 receives video quality metrics from each of the video content receivers 128, 150. The quality analyzer module 114 analyzes the video quality metrics in order to determine a representative set of one or more video quality metrics associated with the multicast group. In a particular embodiment, each video quality metric of the multicast group has a value that does not satisfy a threshold. For example, a microblocking video quality metric may have a value that indicates a decoding number of errors that does not satisfy an acceptable number of errors threshold. As another example, a jitter video quality metric may indicate a latency period between reception of packets value that does not satisfy an acceptable latency period value. The one or more video quality metrics of the representative set are associated with artifacts of a portion of the video content transmission received by the video content receivers 128, 150.

The encoder parameter matcher module 116 matches the one or more video quality metrics of the representative set to one or more encoder parameters that may be set in order to mitigate the video artifacts in the video content transmission. For example, if jitter and microblocking are indicated in the representative set, the encoder parameter matcher module 116 matches these video quality metrics to a variable bit rate (VBR) encoder parameter. Thereafter, the encoder parameter setting module 118 sets values of the matched encoder parameters based on values of the quality metrics of the representative set. For example, the value of the VBR encoder parameter may be increased depending on the particular values of the jitter and microblocking video quality metrics. The encoder parameters are used by the video encoder module 106 to encode a subsequent portion of the video content. The subsequent portion of the video content is sent via the video distribution/transmission module 108 to the video content receivers 128, 150 that are joined to the multicast group, which may include the video content receiver 128, the video content receivers 150, one or more other receivers, or any combination of the foregoing.

After the video content receiver 128 transmits its collected video quality metrics, the subsequent portion of the video content transmission received by the video content receiver 128 is encoded based on encoder parameters set on the basis of video quality metrics received by the video content transmission system 102 from the video content receivers of the multicast group that includes the video content receiver 128. The video content receiver 128 receives the subsequent portion via the video receiver module 132. The video buffer 134 buffers data packets of the subsequent portion of the video content transmission until the video buffer 134 is filled. The size of the video buffer 134 is based on the one or more encoder parameters of the subsequent portion and is sufficient to de-jitter the subsequent portion of the video content transmission. The video buffer 134 sends the data packets to the video decoder module 136. The video decoder module 136 decodes data packets in accordance with one or more encoder parameters. The video decoder module 136 sends decoded video data to the video display module 138, which sends the video data to the video display device 146 for display.

Figure 2:
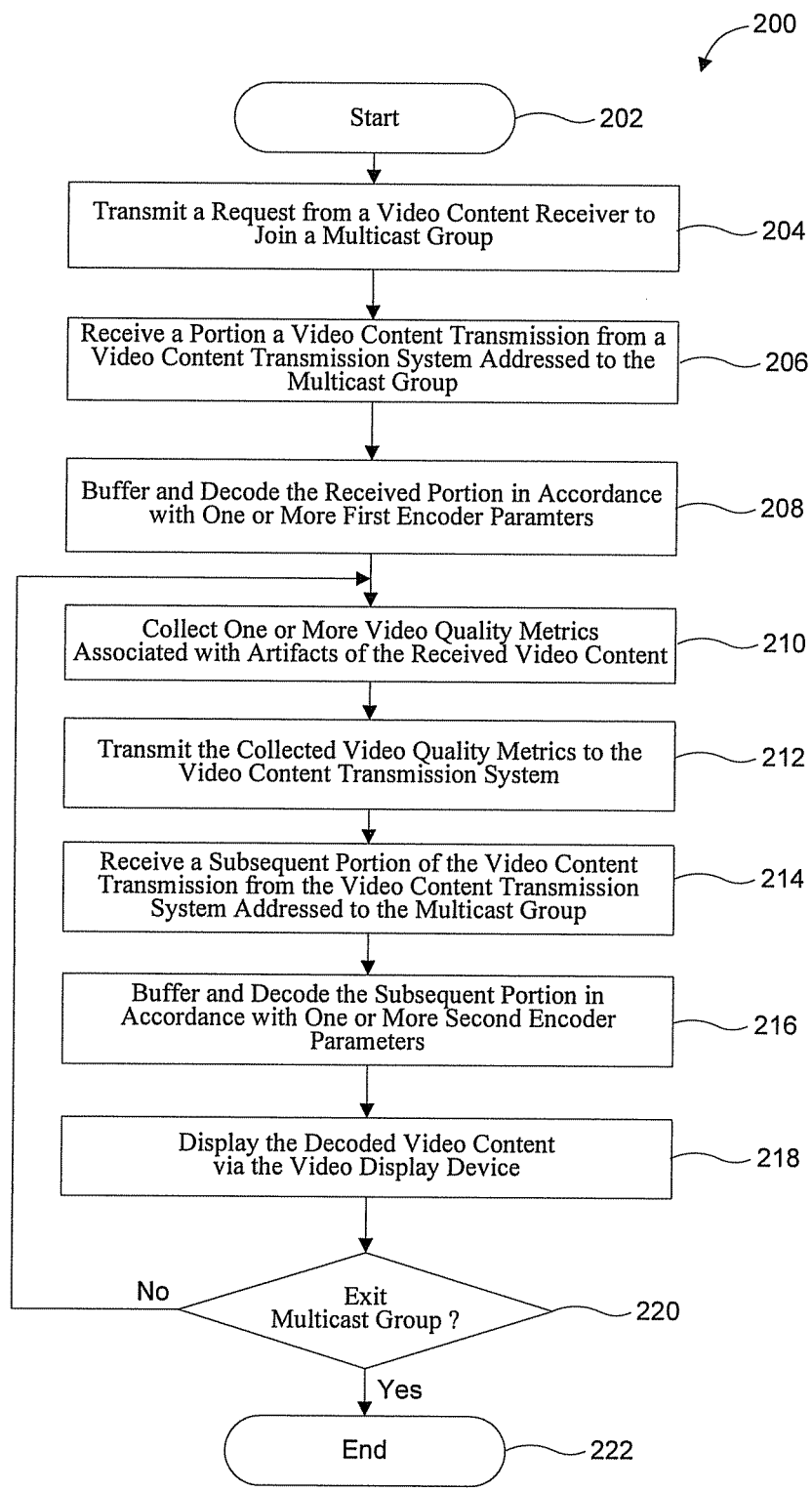
FIG. 2 is a flowchart that illustrates a first embodiment of a method of mitigating video artifacts.

FIG. 2 is a flowchart that illustrates a first embodiment of a method 200 of mitigating video artifacts. The method 200 starts at 202. At 204, a request is transmitted from a video content receiver to join a multicast group. In a particular embodiment, the multicast group is associated with a particular channel of an IPTV system. At 206, a portion of a video content transmission addressed to the multicast group is received from a video content transmission system. The received portion is buffered and decoded in accordance with one or more first encoder parameters set at the video transmission system, at 208. The decoded video content may be displayed via a display device. In an illustrative embodiment, one or more encoder parameters are based on video quality metrics from a plurality of video content receivers that were previously joined to the multicast group (e.g., video content receivers that have received a previous portion of the video content from the video content transmission system).

At 210, one or one more video quality metrics associated with artifacts of the received video content are collected. The collection may be triggered or indicted by a timing indication of a collection timer or by polling from the video transmission system. At 212, the collected video quality metrics are transmitted to the video content transmission system. At 214, a subsequent portion of the video content transmission addressed to the multicast group is received from the video content transmission system. At 216, the subsequent portion is buffered and decoded in accordance with one or more second encoder parameters. The second encoder parameters are based on video quality metrics sent by the video content receivers and one or more other video content receivers joined to multicast group when the video quality metrics were sent to the video content transmission system. The decoded video content is displayed via the video display device, at 218.

At 220, a determination is made whether the receiver is to exit the multicast group. If it is determined that the receiver is to exit the multicast group, the method 200 ends, at 226. Alternatively, if it is determined that that the receiver is not to exit the multicast group, the method continues to 210 to collect another one or one more video quality metrics that are associated with artifacts of the received portion.

Figure 3:
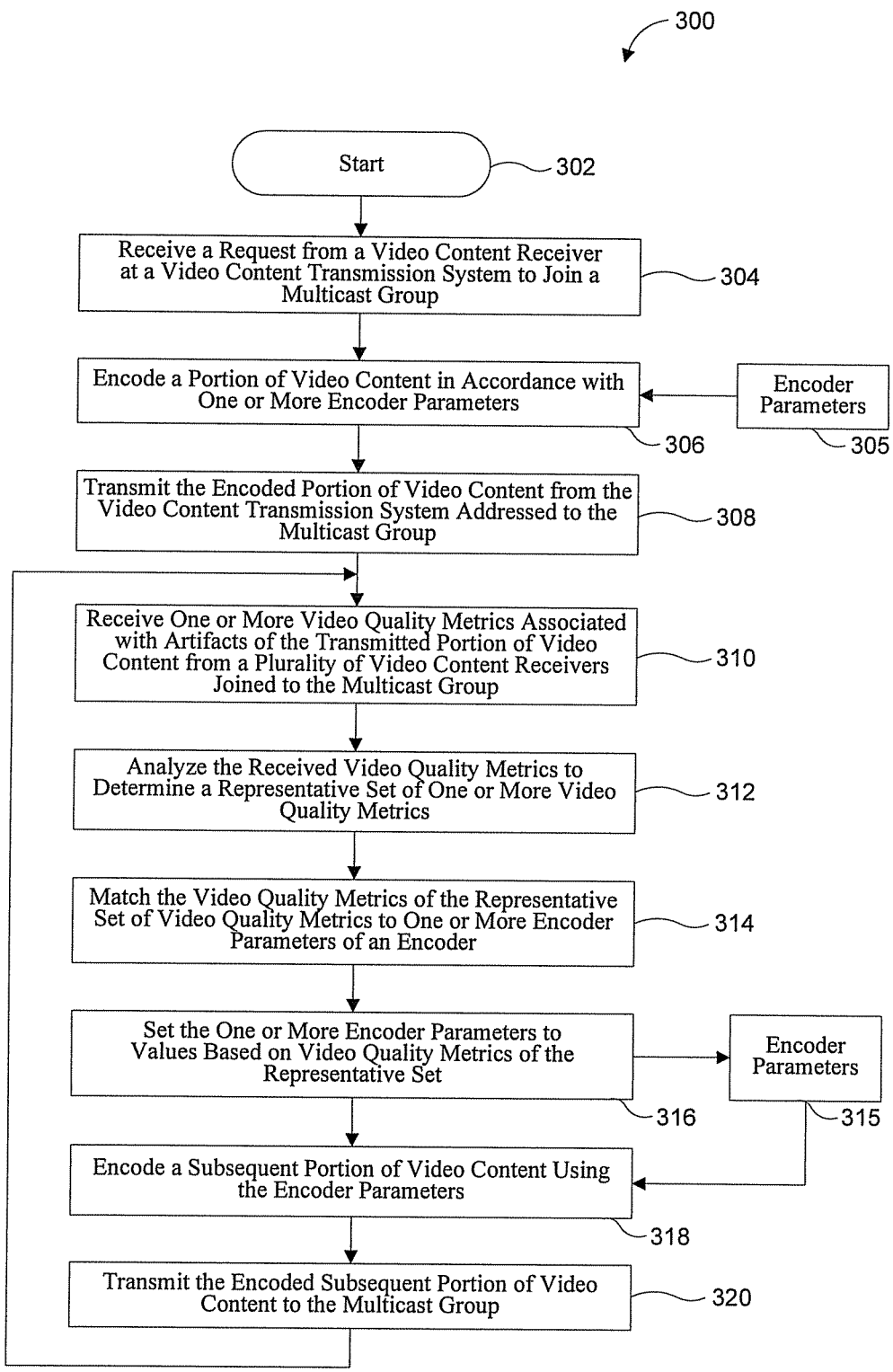
FIG. 3 is a flowchart that illustrates a second embodiment of a method of mitigating video artifacts.

FIG. 3 is a flowchart that illustrates a second embodiment of a method 300 of mitigating video artifacts. The method 300 begins at 302. At 304, a video content transmission system receives a request from a video content receiver to join a multicast group. At 306, a portion of video content is encoded in accordance with one or more encoder parameters 305. In a particular embodiment, the encoder parameters are based on one or more video quality metrics received from a group of video content receivers that were previously joined to the multicast group. At 308, the encoded portion of video content is transmitted from the video content transmission system to the multicast group. At 310, one or more video quality metrics that are associated with artifacts of the transmitted portion of video content are received from a plurality of video content receivers joined to the multicast group. For example, the video content receivers may be same as before or different, or some video content receivers may be the same and some may be different.

At 312, the received video quality metrics are analyzed to determine a representative set of one or more video quality metrics. In a particular embodiment, each video quality metric of the representative set has a value that does not satisfy a threshold. For example, microblocking may be determined when a number of video decoder errors in a given time period is over an acceptable number of errors. As another example, jitter may be determined when a latency period between reception of packets by a video content receiver is over an acceptable latency period. At 314, the video quality metrics of the representative set of video quality metrics are matched to one or more encoder parameters of an encoder. For example, if jitter and microblocking are indicated in the representative set, these video quality metrics are matched to a variable bit rate (VBR) encoder parameter. At 316, the one or more encoder parameters are set to values based on values of the one or more video quality metrics of the representative set. At 318, a subsequent portion of the video content is encoded using encoder parameters 315. Thereafter, at 320, the encoded subsequent portion of video content is transmitted to the multicast group. The multicast group may have the same video content receivers as before or different video content receivers than before, some video content receivers may be the same and some video content receivers may be different. The method 300, continues at 310, where video quality metrics associated with artifacts of the subsequent portion of video content are received from video content receivers joined to the multicast group.

Figure 4:
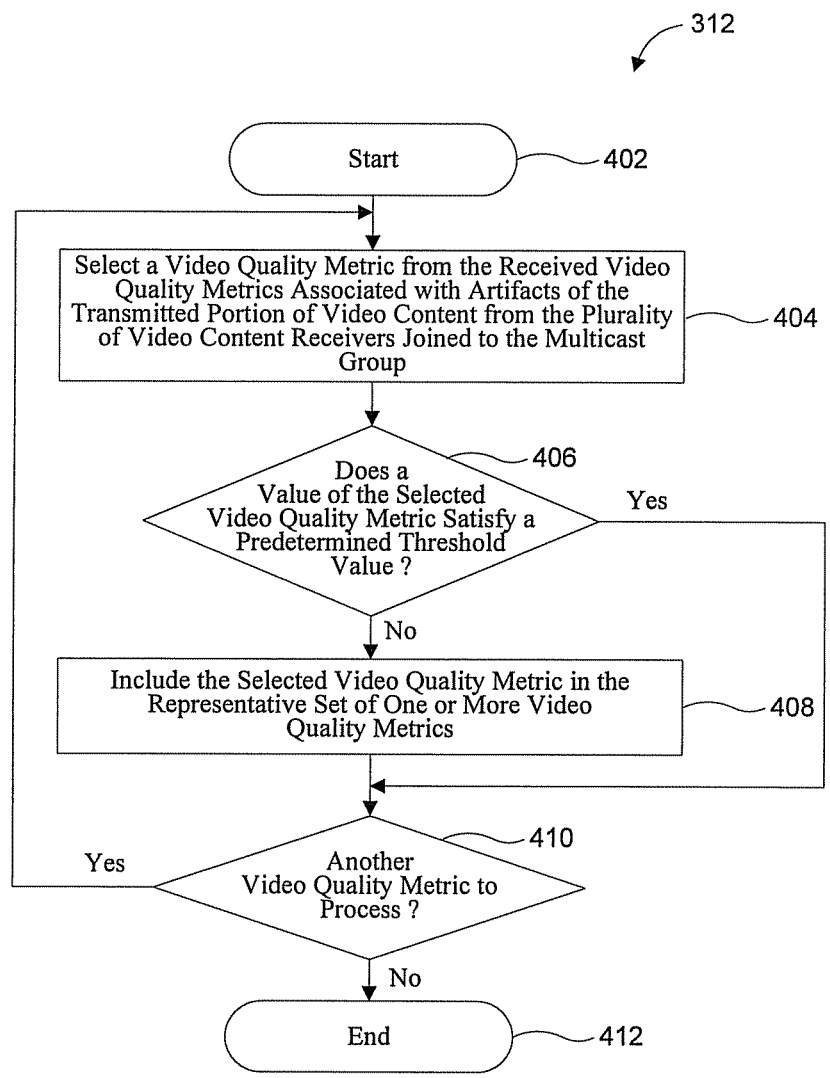
FIG. 4 is a flowchart that illustrates a third embodiment of a method of mitigating video artifacts.

FIG. 4 is a flowchart that illustrates a third embodiment of a method of mitigating video artifacts. The particular method illustrated in FIG. 4 is an example of analyzing received video quality metrics to determine a representative set of one or more video quality metrics, such as at 312 in FIG. 3. The method begins at 402. At 404, a video quality metric is selected from the received video quality metrics associated with artifacts of the transmitted portion of video content from the plurality of video content receivers joined to the multicast group, such as at 310 of FIG. 3. The selected video quality metric has a value that is least desirable for a particular video quality metric amongst the plurality of video content receivers joined to the multicast group.

At 406, a determination is made whether a value of the selected video quality metric satisfies a predetermined threshold value. If it is determined that the value satisfies the predetermined threshold value, then the method continues at 410, where a determination is made whether there is another video quality metric to processes. Alternatively, if it is determined that the value does not satisfy the predetermined threshold value, the method continues at 408.

As an example, a jitter video quality metric may be received from each of a plurality of video content receivers. A jitter video quality metric with a value that is least desirable (e.g., worst latency between reception of packets) amongst the video content receivers is selected. The value of the selected jitter video quality metric is then checked against a predetermined jitter threshold value (e.g., acceptable latency between reception of packets). If the value of the selected jitter video quality metric is worse than the predetermined jitter threshold value, the jitter video quality metric is included in the representative set of video quality metrics. The above methodology is performed for other video quality metrics received from the plurality of video content receivers (e.g., microblocking video quality metrics, black screen video quality metrics, lip-synch video quality metrics, packet loss video quality metrics, latency video quality metrics, or other video quality metrics).

At 408, the selected video quality metric is included in the representative set of one or more video quality metrics. At 410, a determination is made whether there is another video quality metric to process. If there is another video quality metric to process, then the method continues at 404. Alternatively, if there is no other video quality metric to process, then the method ends at 412.

Figure 5:
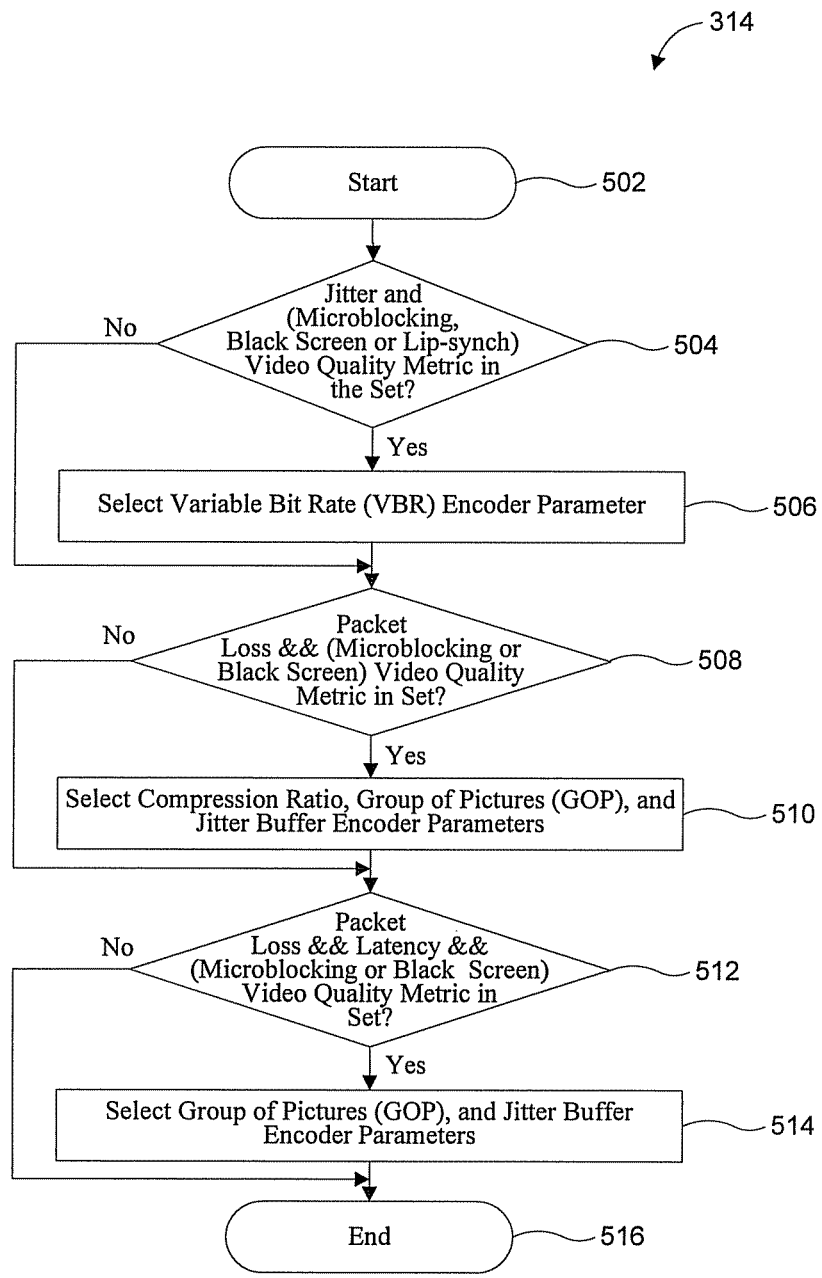
FIG. 5 is a flowchart that illustrates a fourth embodiment of a method of mitigating video artifacts.

FIG. 5 is a flowchart that illustrates a fourth embodiment of a method of mitigating video artifacts. The particular method illustrated in FIG. 5 is an example method of matching one or more video quality metrics of a representative set of video quality metrics to one or more encoder parameters of an encoder, such as at 314 of FIG. 3. The method begins at 502. At 504, a determination is made whether a jitter video quality metric and one of a microblocking video quality metric, a black screen video quality metric and a lip-synch video quality metric are in the representative set of video quality metrics. If jitter and one of microblocking, black screen, and a lip-synch video quality parameters are in the representative set of video quality metrics, then at 506, a variable bit rate (VBR) encoder parameter is selected.

Alternatively, if jitter and one of microblocking, black screen, and a lip-synch video quality parameters are not in the representative set of video quality metrics, then at 508, a determination is made whether a packet loss video quality metric and one of a microblocking video quality metric and a black screen video quality metric are in the representative set of video quality metrics. If packet loss and one of microblocking and black screen video quality parameters are in the representative set of video quality metrics, then at 510, a compression ratio encoder parameter, a group of pictures (GOP) encoder parameter and a jitter buffer encoder parameter are selected.

Alternatively, if packet loss and one of microblocking and black screen video quality parameters are not in the representative set of video quality metrics, then at 512, a determination is made whether a packet loss video quality metric, a latency video quality metric, and one of a microblocking video quality metric and a black screen video quality metric are in the representative set of video quality metrics. If packet loss, latency, and one of microblocking and black screen video quality parameters are in the representative set of video quality metrics, then at 514, a group of pictures (GOP) encoder parameter and a jitter buffer encoder parameter are selected. Alternatively, If packet loss, latency, and one of microblocking and black screen video quality parameters are in the representative set of video quality metrics, then the method ends at 516.

Figure 6:
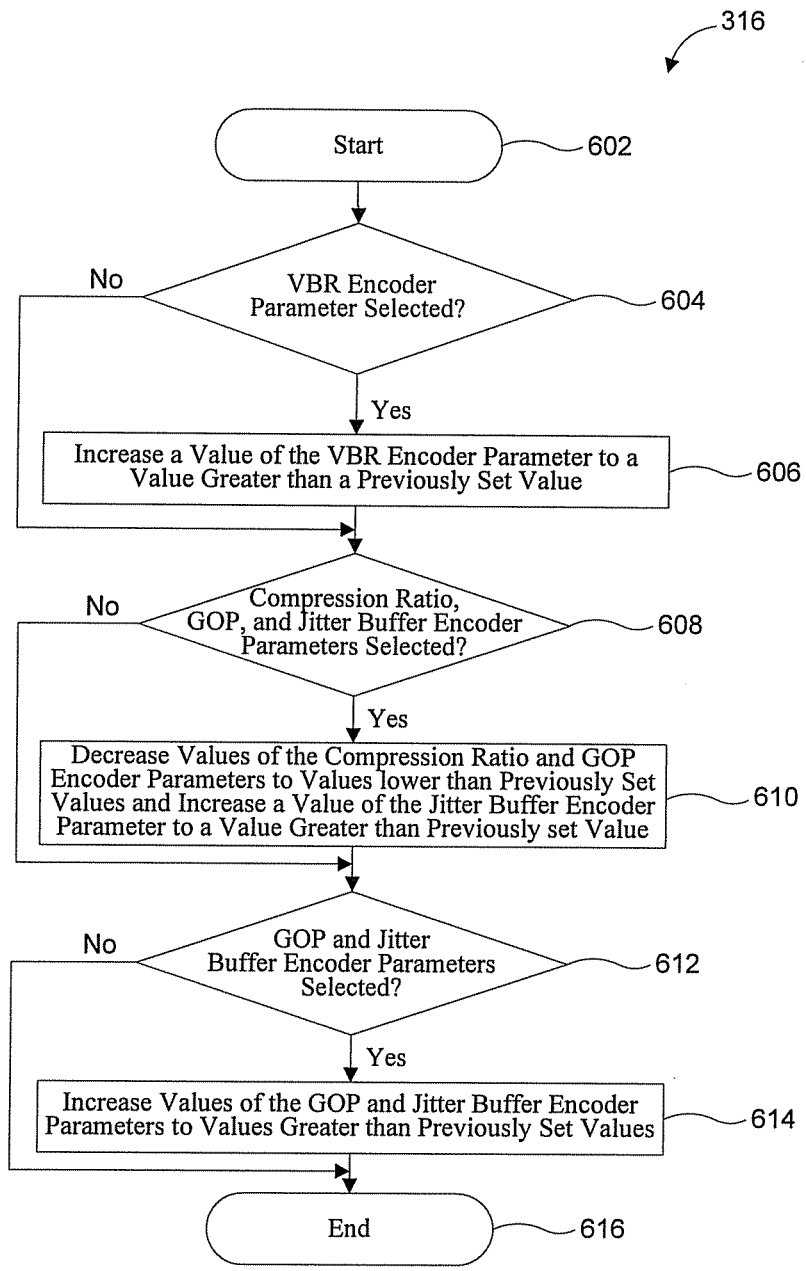
FIG. 6 is a flowchart that illustrates a fifth embodiment of a method of mitigating video artifacts.

FIG. 6 is a flowchart that illustrates a fifth embodiment of a method of mitigating video artifacts. The particular method illustrated in FIG. 6 is an example method of setting one or more encoder parameters based on one or more video quality metrics of a representative set, such as at 316 of FIG. 3. The method begins at 602. At 604, a determination is made whether the variable bit rate (VBR) encoder parameter is selected. If the VBR encoder parameter is selected, then at 606, a value of the VBR encoder parameter is increased to a value greater than a previously set value.

Alternatively, if the VBR encoder parameter is not selected, then the method continues at 608, where a determination is made whether a compression ratio, group of pictures (GOP), and jitter buffer encoder parameters are selected. If the compression ratio, GOP, and jitter buffer encoder parameters are selected, then at 610, values of the compression ratio and GOP encoder parameters are decreased to values lower than previously set values and a value of the of the jitter buffer encoder parameter is increased to a value greater than a previously set value.

Alternatively, if the compression ratio, GOP, and jitter buffer encoder parameters are not selected, then the method continues at 612, where a determination is made whether a GOP and jitter buffer encoder parameters are selected. If the GOP and jitter buffer encoder parameters are selected, then at 614, values of the GOP and jitter buffer encoder parameters are increased to values greater than previously set values. Alternatively, if GOP and jitter buffer encoder parameters are not selected, the method ends at 616.

Figure 7:
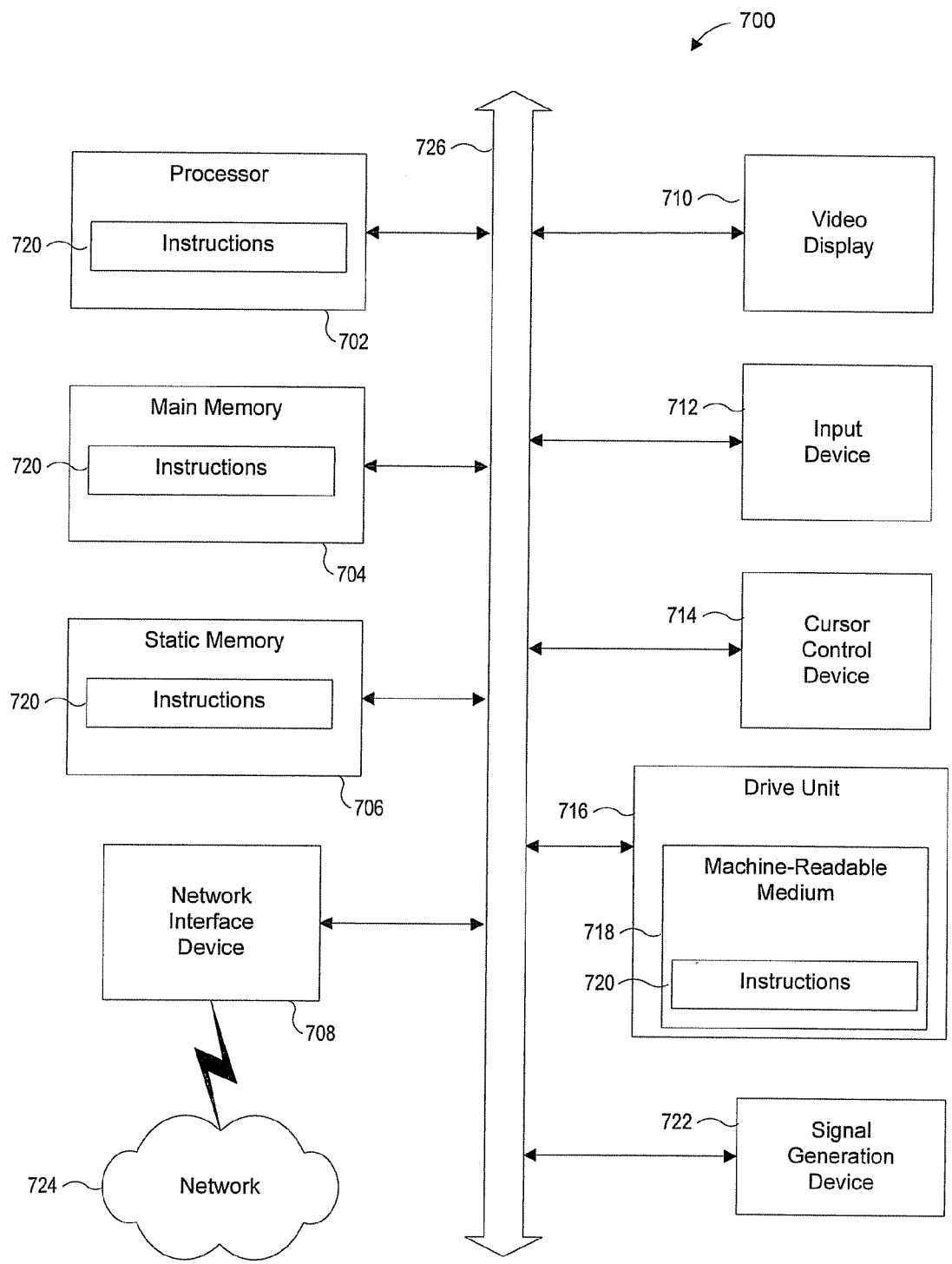
FIG. 7 is a block diagram of an illustrative embodiment of a general computer system.

FIG. 7 is a block diagram of an illustrative embodiment of a general computer system 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices. For example, the computer system 700 may include or be included within any one or more of the video content transmission systems, transmission networks, video content receivers, or other devices depicted in FIG. 1.

In a networked deployment, the computer system 700 may operate in the capacity of an Internet Protocol television (IPTV) server, such as a video server or application server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 726. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 722, such as a speaker or remote control, and a network interface device 708.

In a particular embodiment, as depicted in FIG. 7, the disk drive unit 716 may include a computer-readable medium 718 in which one or more sets of instructions 720, e.g., software, can be embedded. Further, the instructions 720 may embody one or more of the methods or logic as described herein. In a particular embodiment, the instructions 720 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs tangibly embodied in a processor-readable medium and may be executed by a processor. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 720 or receives and executes instructions 720 responsive to a propagated signal, so that a device connected to a network 724 can communicate voice, video or data over the network 724. Further, the instructions 720 may be transmitted or received over the network 724 via the network interface device 708.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, systems, methods and computer-readable storage media to mitigate video artifacts in video content transmission have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method comprising:
transmitting a first portion of a video content transmission to a first plurality of video content receivers before at least one additional video content receiver joins a multicast group of the video content transmission, wherein the first plurality of video content receivers does not include the at least one additional video content receiver;
receiving, at a video distribution system, a plurality of video quality metrics including one or more video quality metrics from each video content receiver of the first plurality of video content receivers, the one or more video quality metrics associated with artifacts of the first portion of the video content transmission wherein the plurality of video quality metrics is received before the at least one additional video content receiver joins the multicast group of the video content transmission;
selecting one or more representative video quality metrics based on analysis of the plurality of video quality metrics, wherein the analysis includes:
selecting at least one video quality metric from the plurality of video quality metrics received from each video content receiver of the first plurality of video content receivers;
determining whether a value of the at least one video quality metric satisfies a predetermined threshold value; and
including the at least one video quality metric in the one or more representative video quality metrics based on determining that the value of the at least one video quality metric satisfies the predetermined threshold value;
setting one or more encoder parameters based on the one or more representative video quality metrics;
encoding a second portion of the video content transmission using the one or more encoder parameters;
encoding the first portion of the video content transmission using one or more previous encoder parameters that are based in part on the plurality of video quality metrics received from each video content receiver of the first plurality of video content receivers, wherein the first portion is encoded for transmission to the at least one additional video content receiver, and wherein the previous encoder parameters are not based on one or more particular video quality metrics received from the at least one additional video content receiver;
transmitting, to the at least one additional video content receiver, the first portion of the video content transmission encoded using the one or more previous encoder parameters; and
transmitting the encoded second portion to a second plurality of video content receivers.

2. The method of claim 1, wherein each of the one or more video quality metrics received from each video content receiver of the first plurality of video content receivers is associated with one of a plurality of video quality metric types, wherein the plurality of video quality metrics received from each video content receiver of the first plurality of video content receivers includes at least one set of video quality metrics associated with one of the plurality of video quality metric types and associated with more than one video content receiver of the first plurality of video content receivers, and wherein one of the at least one set of video quality metrics is included in the one or more representative video quality metrics, the one of the at least one set of video quality metrics having a lowest value among the set of video quality metrics.

3. The method of claim 1, wherein setting the one or more encoder parameters based on the one or more representative video quality metrics includes matching the one or more representative video quality metrics to the one or more encoder parameters that are to be set, and wherein each of the one or more representative video quality metrics is associated with one of a plurality of video quality metric types.

4. The method of claim 3, wherein the one or more encoder parameters include a variable bit rate encoder parameter, and wherein the variable bit rate encoder parameter is set based on values of the one or more representative video quality metrics associated with a jitter video quality metric type and associated with one of a microblocking video quality metric type, a black screen video quality metric type, and a video sound synchronization quality metric type.

5. The method of claim 1, wherein the one or more representative video quality metrics includes a black screen video quality metric type, a video sound synchronization quality metric type, or both.

6. The method of claim 3, wherein matching the one or more representative video quality metrics to the one or more encoder parameters that are to be set includes selecting a set of the one or more encoder parameters based on values of the one or more representative video quality metrics associated with a packet loss video quality metric type and associated with a microblocking video quality metric type and a black screen video quality metric type, wherein the set of the one or more encoder parameters includes a compression ratio encoder parameter, a group of pictures encoder parameter, and a jitter buffer encoder parameter.

7. The method of claim 6, wherein setting the one or more encoder parameters includes decreasing each of a value of the compression ratio encoder parameter and a value of the group of pictures encoder parameter from a first previous value to a first new value and increasing a value of the jitter buffer encoder parameter from a second previous value to a second new value.

8. The method of claim 3, wherein matching the one or more representative video quality metrics to the one or more encoder parameters that are to be set includes selecting a set of the one or more encoder parameters based on values of the one or more representative video quality metrics associated with a packet loss video quality metric type, a latency video quality metric type, and one of a microblocking video quality metric type and a black screen video quality metric type, wherein the set of the one or more encoder parameters includes a group of pictures encoder parameter and a jitter buffer encoder parameter.

9. The method of claim 8, further comprising increasing each of a value of the group of pictures encoder parameter and a value of the jitter buffer encoder parameter from a previous value to a new value.

10. A video content transmission system comprising:
  a transmission module to transmit a first portion of a video content transmission to a first plurality of video content receivers before at least one additional video content receiver joins a multicast group of the video content transmission, wherein the first plurality of video content receivers does not include the at least one additional video content receiver
  a video performance manager to:
    receive a plurality of video quality metrics including one or more video quality metrics from each video content receiver of the first plurality of video content receivers, the one or more video quality metrics associated with artifacts of the first portion of the video content transmission, wherein the plurality of video quality metrics is received before the at least one additional video content receiver joins the multicast group of the video content transmission;
    select one or more representative video quality metrics based on analysis of the plurality of video quality metrics, wherein the analysis includes:
      selecting at least one video quality metric from the plurality of video quality metrics received from each video content receiver of the first plurality of video content receivers;
      determining whether a value of the at least one video quality metric satisfies a predetermined threshold value; and
      including the at least one video quality metric in the one or more representative video quality metrics based on determining that the value of the at least one video quality metric satisfies the predetermined threshold value; and
    adjust one or more encoder parameters based on the one or more representative video quality metrics; and
  an encoder module to:
    encode the first portion of the video content transmission using one or more previous encoder parameters that are based in part on the plurality of video quality metrics received from each video content receiver of the first plurality of video content receivers, wherein the first portion is encoded for transmission to the at least one additional video content receiver, and wherein the previous encoder parameters are not based on one or more particular video quality metrics received from the at least one additional video content receiver; and
    encode a subsequent portion of the video content transmission using the one or more encoder parameters.

11. The video content transmission system of claim 10, wherein the video performance manager includes a quality analyzer module to perform the analysis of the plurality of video quality metrics to select the one or more representative video quality metrics.

12. The video content transmission system of claim 10, wherein the one or more representative video quality metrics includes a black screen video quality metric type, a video sound synchronization quality metric type, or both.

13. The video content transmission system of claim 10, wherein the video performance manager includes a parameter setting module to set the one or more encoder parameters based on values of the one or more representative video quality metrics.

14. The video content transmission system of claim 10, wherein the transmission module is further configured to transmit the encoded subsequent portion to a subsequent plurality of video content receivers for display.

15. The video content transmission system of claim 10, wherein the one or more encoder parameters include a variable bit rate encoder parameter, and wherein the variable bit rate encoder parameter is set based on values of the one or more representative video quality metrics associated with a jitter video quality metric type and associated with one of a microblocking video quality metric type, a black screen video quality metric type, and a video sound synchronization quality metric type.

16. The video content transmission system of claim 10, wherein the video performance manager sets a compression ratio encoder parameter, a group of pictures encoder parameter, and a jitter buffer encoder parameter based on values of the one or more representative video quality metrics associated with a packet loss video quality metric type and one of a microblocking video quality metric type and a black screen video quality metric type.

17. The video content transmission system of claim 10, wherein the video performance manager sets a group of pictures encoder parameter and a jitter buffer encoder parameter based on values of the one or more representative video quality metrics associated with a packet loss video quality metric type, a latency video quality metric type, and one of a microblocking video quality metric type and a black screen video quality metric type.

18. A computer-readable storage device comprising instructions that, when executed by a processor, cause the processor to perform operations comprising:
  transmitting a first portion of a video content transmission to a first plurality of video content receivers before at least one additional video content receiver joins a multicast group of the video content transmission, wherein the first plurality of video content receivers does not include the at least one additional video content receiver;
  receiving a plurality of video quality metrics including one or more video quality metrics from each video content receiver of the first plurality of video content receivers, the one or more video quality metrics associated with artifacts of the first portion of the video content transmission, wherein the plurality of video quality metrics is received before the at least one additional video content receiver joins the multicast group of the video content transmission;

selecting one or more representative video quality metrics based on analysis of the plurality of video quality metrics, wherein the analysis includes:

selecting at least one video quality metric of a particular video quality metric type from the plurality of video quality metrics having a value that is least desirable amongst the plurality of video quality metrics associated with the particular video quality metric type;

determining whether a value of the at least one video quality metric satisfies a predetermined threshold value; and including the at least one video quality metric in the one or more representative video quality metrics based on determining that the value of the at least one video quality metric satisfies the predetermined threshold value;

setting one or more encoder parameters based on the one or more representative video quality metrics;

encoding a second portion of the video transmission using the one or more encoder parameters;

encoding the first portion of the video content transmission using one or more previous encoder parameters that are based in part on the plurality of video quality metrics received from each video content receiver of the first plurality of video content receivers, wherein the first portion is encoded for transmission to the at least one additional video content receiver, and wherein the previous encoder parameters are not based on one or more particular video quality metrics received from the at least one additional video content receiver;

transmitting, to the at least one additional video content receiver, the first portion of the video content transmission encoded using the one or more previous encoder parameters; and transmitting the encoded second portion to a second plurality of video content receivers.

* * * * *